Aug. 17, 1937.  M. R. GLENNEY  2,090,037

INSTRUCTION SHEET

Filed Oct. 19, 1934  2 Sheets-Sheet 1

Aug. 17, 1937.  M. R. GLENNEY  2,090,037
INSTRUCTION SHEET
Filed Oct. 19, 1934   2 Sheets—Sheet 2

FIG_3_

Addition and Subtraction    Set-1-B

| -1- | | -2- | | -3- | | -4- | |
|---|---|---|---|---|---|---|---|
| 8 - 1 = | 7 | 5 - 2 = | 3 | 7 - 3 = | 4 | 3 + 7 = | 10 |
| 8 - 7 = | 1 | 5 - 3 = | 2 | 7 - 4 = | 3 | 7 + 3 = | 10 |
| 3 - 1 = | 2 | 1 + 5 = | 6 | 8 - 5 = | 3 | 10 - 3 = | 7 |
| 3 - 2 = | 1 | 5 + 1 = | 6 | 8 - 3 = | 5 | 10 - 7 = | 3 |
| 4 + 4 = | 8 | 6 - 1 = | 5 | 5 + 5 = | 10 | 9 + 9 = | 18 |
| 8 - 4 = | 4 | 6 - 5 = | 1 | 10 - 5 = | 5 | 18 - 9 = | 9 |
| 1 + 6 = | 7 | 2 + 4 = | 6 | 6 + 6 = | 12 | 2 + 8 = | 10 |
| 6 - 1 = | 7 | 4 + 2 = | 6 | 12 - 6 = | 6 | 8 + 2 = | 10 |
| 7 - 1 = | 6 | 6 - 2 = | 4 | 1 + 9 = | 10 | 10 - 2 = | 8 |
| 7 - 6 = | 1 | 6 - 4 = | 2 | 9 + 1 = | 10 | 10 - 8 = | 2 |
| 3 + 6 = | 9 | 4 + 3 = | 7 | 9 - 0 = | 9 | 6 + 2 = | 8 |
| 6 + 3 = | 9 | 2 + 6 = | 8 | 0 + 8 = | 8 | 2 + 0 = | 2 |

FIG_4_

Addition and Subtraction    Set-1-B

| -1- | -2- | -3- | -4- |
|---|---|---|---|
| 8 - 1 = | 5 - 2 = | 7 - 3 = | 3 + 7 = |
| 8 - 7 = | 5 - 3 = | 7 - 4 = | 7 + 3 = |
| 3 - 1 = | 1 + 5 = | 8 - 5 = | 10 - 3 = |
| 3 - 2 = | 5 + 1 = | 8 - 3 = | 10 - 7 = |
| 4 + 4 = | 6 - 1 = | 5 + 5 = | 9 + 9 = |
| 8 - 4 = | 6 - 5 = | 10 - 5 = | 18 - 9 = |
| 1 + 6 = | 2 + 4 = | 6 + 6 = | 2 + 8 = |
| 6 - 1 = | 4 + 2 = | 12 - 6 = | 8 + 2 = |
| 7 - 1 = | 6 - 2 = | 1 + 9 = | 10 - 2 = |
| 7 - 6 = | 6 - 4 = | 9 + 1 = | 10 - 8 = |
| 3 + 6 = | 4 + 3 = | 9 - 0 = | 6 + 2 = |
| 6 + 3 = | 2 + 6 = | 0 + 8 = | 2 + 0 = |

INVENTOR.
Mildred R. Glenney
BY Joseph B. Gardner
ATTORNEY

Patented Aug. 17, 1937

2,090,037

UNITED STATES PATENT OFFICE 2,090,037

INSTRUCTION SHEET

Mildred R. Glenney, Berkeley, Calif.

Application October 19, 1934, Serial No. 749,037

2 Claims. (Cl. 35—31)

The invention relates to devices used to assist in the instruction of arithmetic and other subjects to students particularly of an early grammar school age.

An object of the invention is to provide an instruction sheet of the character described which will afford in simple, compact and convenient form a relatively large number of problems or exercises together with means for readily checking the answers and thereby quickly determining the speed and accuracy of the student's work.

Another object of the invention is to provide an instruction sheet of the character described which may be used in conjunction with, and provide for all writing on, an auxiliary piece of ordinary scratch paper to thereby enable the use of the instruction sheet over and over again without incurring any writing or erasures on the same or in any other way wearing or mutilating the sheet other than entailed in ordinary handling.

A further object of the invention is to provide an instruction sheet of the above character which will be particularly low in cost of production, a factor which in accordance with my invention is assisted by the provision that the sheets may be readily cut into their cooperating parts or sections either by the student or the instructor at the time of, or prior to, their use.

Still another object of the invention is to provide an instruction sheet of the character described which the student will enjoy using and which will stimulate the interest of the student in the particular subject of the instruction sheet.

The invention possesses other objects and features of advantage, some of which, with the foregoing, will be set forth in the following description of the preferred form of the invention which is illustrated in the drawings accompanying and forming part of the specification. It is to be understood, however, that variations in the showing made by the said drawings and description may be adopted within the scope of the invention as set forth in the claims.

Referring to said drawings:

Figure 1 is a plan view of an instruction sheet arranged in accordance with my invention.

Figure 2 is a view similar to Figure 1, but showing the instruction sheet cut into the operative sections thereof.

Figure 3 is a plan view of a somewhat modified form of the instruction sheet.

Figure 4 is a view similar to Figure 3, but with the instruction sheet cut in accordance with my invention and a separate work sheet operatively arranged therewith.

With reference to the drawings and particularly to Figures 1 and 2 thereof, the instruction sheet of my invention comprises in general a sheet 6 which has printed or otherwise indicated thereon a plurality of exercises or problems 7 and which is arranged for cutting into different parts or sections which bear an operable relation to each other as will be hereinafter pointed out. In the present embodiment the problems each contain several elements and some with answers are arranged in spaced vertical columns 8 and 9 with the problems in one column aligned with the problems in the other. For the purpose of the present disclosure the problems consist of arithmetic formulas with each column composed of exercises or drills in the multiplication table of some number, here shown in column 8 as the two table and in column 9 as the three table, altho as will be clear the sheet may be adapted for exercises in history, geography, or other subjects with practically equal facility.

As will be noted from the drawings, the problems in each column are alternately complete and incomplete as to elements thereof and that the incomplete problems or formulas of one column are aligned with the complete problems or formulas of the other column. In accordance with my invention the sheet is arranged for cutting or other severance along a dotted, perforated, or weakened line 10 in a manner affording division of the sheet into three separate sections, numbered from left to right 11, 12 and 13, and with the sections 11 and 13 containing for the most part the columns 8 and 9 and with the intermediate section 12 removing from each of the complete formulas aforesaid an element 14 thereof to thereby leave all of the examples on sections 11 and 13 incomplete and capable of solution. As a further and most important feature of my invention, the problems are orginally arranged so that the elements 14 removed on the center section from the completed formulas will complete the formula aligned with said elements in the opposite column.

It is further to be noted that the missing elements of the original problems, as shown in Figure 1, appear in each instance to the outside of the respective columns. By reason of this arrangement and the relationships set forth above, it will be seen, with reference to Figure 2, that on placing the center or answer section 12 to either side of the problem sections 11 and 13, the answers or missing elements to each of the problems will appear on the section 12 directly adjacent its proper position to the problem.

In practice the sections 11 and 13 are positioned face up upon a separate work sheet 16 and with the answer section 12 turned face down on the desk. The missing elements to each of the problems are then written on the work sheet below the problem section in the spaces 17 provided therefor. At the completion of this operation the answer section 12 is turned face up and by positioning the same first to the left and then to the right of the problem section the recorded answers may be quickly and readily checked.

In Figures 3 and 4, is shown a slightly modified form of an instruction sheet 20 where the answer columns 21 are not severed completely from the problem columns 22 but are merely severed to the free edge 23 of the sheet to permit either folding back out of sight or covering with a work sheet. A preferred method of use of this form of the invention is to insert a work sheet 24 over the answer columns and under the problem columns, as indicated in Figure 4, and to have the student write on the work sheet opposite each problem the answer therefor. After this operation is completed, the relation of the columns to the work sheet may be reversed, that is with the answer columns on top and the problem columns covered, and if in this relation the work sheet is moved a little sidewise, the recorded and furnished answers will appear in side by side relation for checking and correction.

I claim:

1. An instruction device of the character described comprising a sheet formed along a side edge thereof with a plurality of projections defining spaces therebetween, a plurality of problems indicated on said sheet and having incomplete elements at said spaces, and a second sheet having portions fitting into said spaces with said elements indicated thereon.

2. An instruction device comprising, a pair of sections having interfitting projecting and recess portions along opposed side edges, problems indicated on one of said sections with incomplete portions at said recess portions, said incomplete portions being indicated on the projecting portions of said other sections.

MILDRED R. GLENNEY.